United States Patent
Maenpaa

(10) Patent No.: US 9,379,777 B2
(45) Date of Patent: *Jun. 28, 2016

(54) NEAR FIELD COMMUNICATION CIRCUITRY USED FOR HEARING AID COMPATIBILITY

(75) Inventor: Ossi E. Maenpaa, Salo (FI)

(73) Assignee: Nokia Technologies Oy, Espoo (FI)

( * ) Notice: Subject to any disclaimer, the term of this patent is extended or adjusted under 35 U.S.C. 154(b) by 289 days.

This patent is subject to a terminal disclaimer.

(21) Appl. No.: 13/465,322

(22) Filed: May 7, 2012

(65) Prior Publication Data

US 2013/0295845 A1    Nov. 7, 2013

(51) Int. Cl.
*H04B 5/00* (2006.01)

(52) U.S. Cl.
CPC .............. *H04B 5/0006* (2013.01); *H04B 5/00* (2013.01); *H04B 5/0081* (2013.01)

(58) Field of Classification Search
CPC ................................................ H01R 2225/51
See application file for complete search history.

(56) References Cited

U.S. PATENT DOCUMENTS

| | | | | | |
|---|---|---|---|---|---|
| 4,742,278 | A | * | 5/1988 | Iannini | 315/248 |
| 5,917,369 | A | * | 6/1999 | Nguyen | 330/10 |
| 5,973,569 | A | * | 10/1999 | Nguyen | 330/298 |
| 6,518,838 | B1 | * | 2/2003 | Risbo | 330/10 |
| 6,951,305 | B2 | | 10/2005 | Overhultz et al. | 235/487 |
| 7,274,292 | B2 | | 9/2007 | Velhal et al. | 340/539.32 |
| 7,418,106 | B2 | | 8/2008 | Greuet et al. | 381/331 |
| 2003/0044033 | A1 | * | 3/2003 | Julstrom | H04R 25/43 381/315 |
| 2003/0152243 | A1 | | 8/2003 | Julstrom et al. | 381/315 |
| 2005/0002534 | A1 | * | 1/2005 | Aubauer et al. | 381/1 |
| 2005/0111679 | A1 | * | 5/2005 | Husung | 381/312 |
| 2006/0092063 | A1 | * | 5/2006 | Ido et al. | 341/144 |
| 2006/0133633 | A1 | | 6/2006 | Hyvonen | 381/315 |
| 2007/0008140 | A1 | * | 1/2007 | Saarisalo et al. | 340/572.7 |
| 2007/0026826 | A1 | * | 2/2007 | Wilson | 455/130 |
| 2007/0030061 | A1 | * | 2/2007 | Cho et al. | 330/10 |
| 2008/0226094 | A1 | * | 9/2008 | Rutschman | 381/79 |
| 2009/0121835 | A1 | * | 5/2009 | Borret et al. | 340/10.1 |
| 2009/0285426 | A1 | | 11/2009 | Boguslavskij | 381/323 |
| 2009/0322640 | A1 | * | 12/2009 | LeVan | 343/788 |
| 2010/0130126 | A1 | * | 5/2010 | Takayama | 455/41.1 |
| 2011/0050164 | A1 | | 3/2011 | Partovi et al. | 320/108 |
| 2011/0130093 | A1 | * | 6/2011 | Walley et al. | 455/41.1 |
| 2011/0319018 | A1 | * | 12/2011 | Kroman | 455/41.1 |
| 2012/0063505 | A1 | * | 3/2012 | Okamura et al. | 375/238 |
| 2012/0148060 | A1 | * | 6/2012 | Isberg | 381/71.1 |
| 2012/0287985 | A1 | * | 11/2012 | Okamura et al. | 375/238 |

(Continued)

FOREIGN PATENT DOCUMENTS

| | | |
|---|---|---|
| CN | 101232124 A | 7/2008 |
| EP | 2026406 A1 | 2/2009 |

(Continued)

OTHER PUBLICATIONS

Elizabeth Woyke, "Powermat Combining NFC Mobile Payments With Wireless Charging", Forbes, Feb. 24, 2011, 5 pgs.

*Primary Examiner* — Andrew Wendell
*Assistant Examiner* — Cindy Trandai
(74) *Attorney, Agent, or Firm* — Harrington & Smith

(57) ABSTRACT

An apparatus including a coil antenna; and near field communication (NFC) circuitry connected to the coil antenna. The NFC circuitry is configured to create a modulated signal from an input audio signal, and output the modulated signal to the coil antenna.

17 Claims, 7 Drawing Sheets

(56) References Cited

U.S. PATENT DOCUMENTS

2013/0052947 A1* 2/2013 Kole et al. .................... 455/41.1
2013/0103111 A1* 4/2013 Meskens ............ A61N 1/37217
  607/57

FOREIGN PATENT DOCUMENTS

| WO | WO-2007/032890 A1 | 3/2007 |
| WO | WO-2011/095841 A2 | 8/2011 |

* cited by examiner

NEAR FIELD COMMUNICATION CIRCUITRY USED FOR HEARING AID COMPATIBILITY

BACKGROUND

1. Technical Field

The exemplary and non-limiting embodiments relate generally to an apparatus having a hearing aid compatibility system and a near field communication system and, more particularly, to a common component used in the apparatus.

2. Brief Description of Prior Developments

Hand-held communications devices are being designed slimmer and more compact with various components and modules, and with larger displays. These design arrangements leave less room for earpiece integration. Therefore, smaller earpiece components are used. However, such smaller earpiece components can only produce limited magnetic field which is not well suited for hearing aid compatible (HAC) requirements.

SUMMARY

The following summary is merely intended to be exemplary. The summary is not intended to limit the scope of the claims.

In accordance with one aspect, an apparatus is provided including a coil; and near field communication (NFC) circuitry connected to the coil. The NFC circuitry may be configured to create a modulated signal from an input audio signal, and output the modulated signal to the coil.

In accordance with another aspect, a method may comprise receiving an audio signal by near field communication (NFC) circuitry; and modulating the audio signal by the NFC circuitry.

In accordance with another aspect, a method may comprise sending a modulated signal from near field communication (NFC) circuitry to at least one coil, where the modulated signal is formed from an audio signal received by the NFC circuitry; and the modulated signal generating a magnetic field at the coil, where the NFC circuitry and the coil form part of a hearing aid compatibility (HAC) system.

In accordance with another aspect, a non-transitory program storage device is provided readable by a machine, tangibly embodying a program of instructions executable by the machine for performing operations, the operations comprising sending an audio signal to near field communication (NFC) circuitry, where the NFC circuitry may be configured to form a modulated signal based upon the audio signal; and sending the modulated signal to a coil to generate a magnetic field at the coil as part of a hearing aid compatibility (HAC) system.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
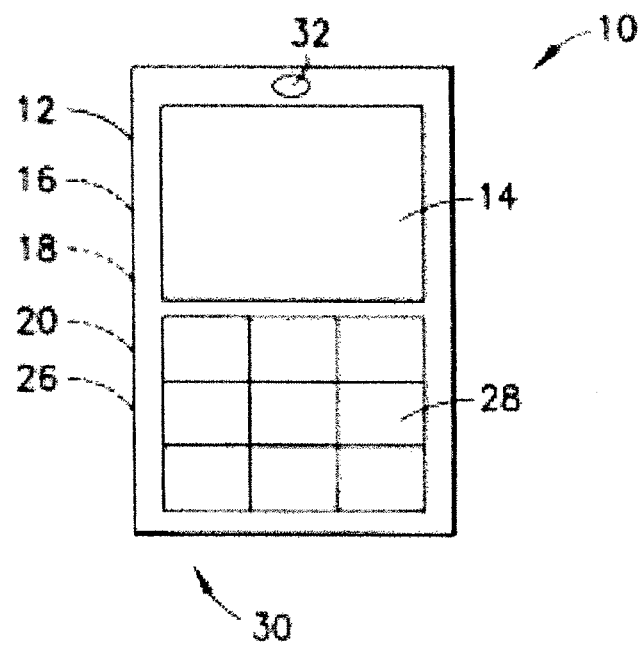
FIG. 1 is a front view of an example embodiment.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
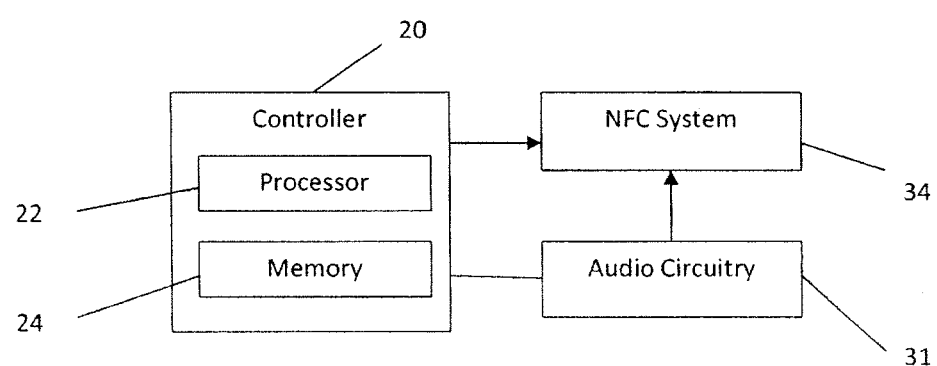
FIG. 2 is a diagram illustrating components of the apparatus shown in FIG. 1.
Figure 3:
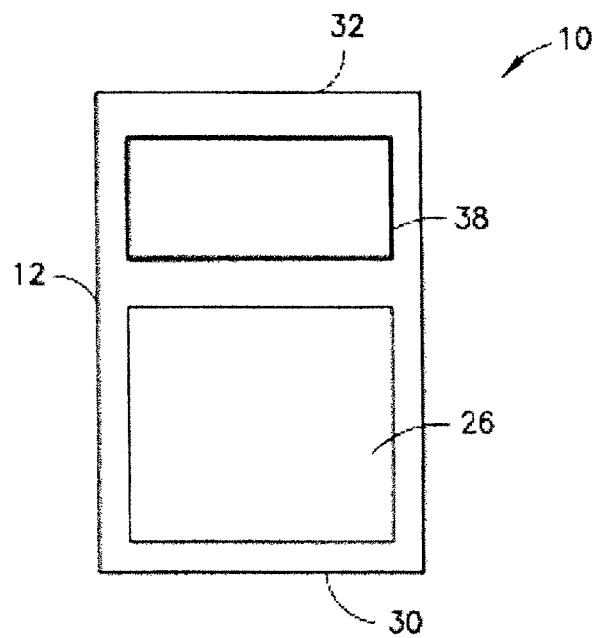
FIG. 3 shows a rear side of the apparatus shown in FIG. 1.
Figure 4:
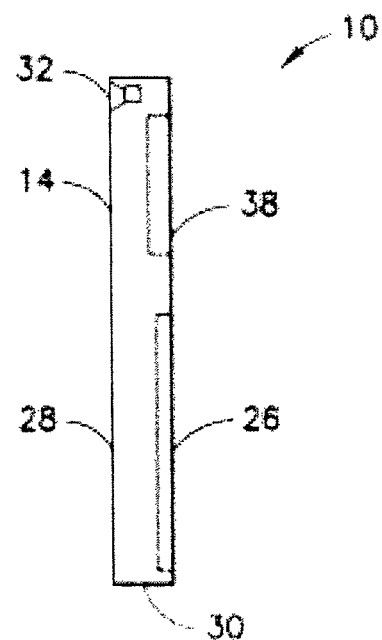
FIG. 4 is a side view of the apparatus shown in FIG. 1.

The apparatus 10 may be a hand-held communications device which includes a telephone application. The apparatus 10 may also comprise an Internet browser application, camera application, video recorder application, music player and recorder application, email application, navigation application, gaming application, and/or any other suitable electronic device application. Referring also to FIGS. 2-4, the apparatus 10, in this example embodiment, comprises a housing 12, a display 14, a receiver 16, a transmitter 18, a rechargeable battery 26, and a controller 20 which can include at least one processor 22, at least one memory 24, and software. However, all of these features are not necessary to implement the features described below.

The display 14 in this example may be a touch screen display which functions as both a display screen and as a user input. However, features described herein may be used in a display which does not have a touch, user input feature. The user interface may also include a keypad 28. However, the keypad might not be provided if a touch screen is used. The electronic circuitry inside the housing 12 may comprise a printed wiring board (PWB) having components such as the controller 20 thereon. The circuitry may include a sound transducer 30 provided as a microphone and a sound transducer 32 provided as a speaker or earpiece. The housing 12 may have sound holes for sound to travel to and from the sound transducers through the housing 12. The circuitry may include audio circuitry 31 connected to the controller 20 configured to drive the sound transducer 32.

Figure 5:
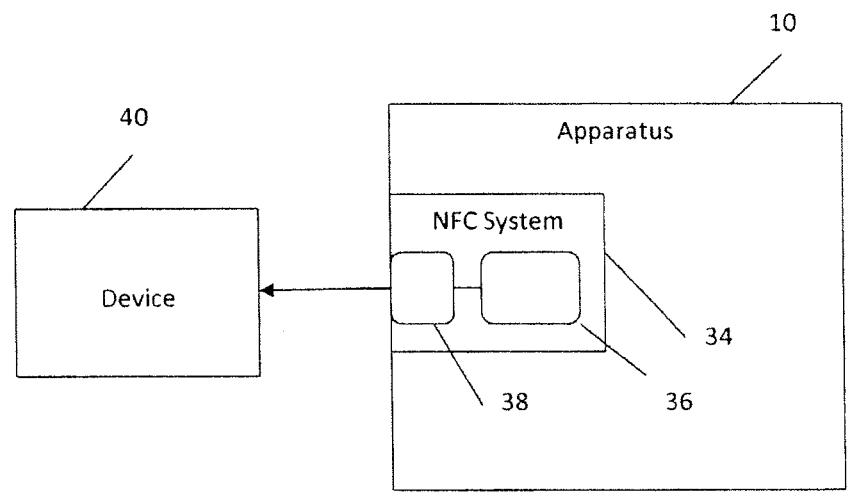
FIG. 5 is a diagram illustrating connection between the apparatus and a device with use of a near field communication.

Referring also to FIG. 5, the apparatus 10 may comprise a Near Field Communication (NFC) system 34. Near field communication, or NFC, allows for simplified transactions, data exchange, and wireless connections between two devices in close proximity to each other, usually by no more than a few centimeters. Many smartphones currently on the market may contain embedded NFC chips that can send encrypted data a short distance ("near field") to a reader located, for instance, next to a retail cash register. Shoppers who have their credit card information stored in their NFC smartphones can pay for purchases by waving their smartphones near or tapping them on the reader, rather than bothering with the actual credit card.

The Near Field Communication Forum (NFC Forum) formed in 2004 promotes sharing, pairing, and transactions between NFC devices and develops and certifies device compliance with NFC standards. A smartphone or tablet with an NFC chip could make a credit card payment or serve as keycard or ID card. NFC devices may read NFC tags on a museum or retail display to get more information or an audio or video presentation. NFC may share a contact, photo, song, application, or video or pair Bluetooth devices.

NFC is a set of short-range wireless technologies, typically requiring a distance of 4 cm or less. NFC can operate at 13.56 MHz on ISO/IEC 18000-3 air interface and at rates ranging from 106 kbit/s to 424 kbit/s. NFC involves an initiator and a target; the initiator actively generates an RF field that may power a passive target. This enables NFC targets to take very simple form factors such as tags, stickers, key fobs, or cards that do not require batteries. NFC peer-to-peer communication is of course possible, where both devices are powered.

NFC tags contain data and are typically read-only, but may be rewriteable. They may be custom-encoded by their manufacturers or use the specifications provided by the NFC Forum, an industry association charged with promoting the technology and setting key standards. The tags may securely store personal data such as debit and credit card information, loyalty program data, PINs and networking contacts, among other information. The NFC Forum defines different types of tags which provide different communication speeds and capabilities in terms of configurability, memory, security, data retention and write endurance. Tags may offer between 96 and 512 bytes of memory, as a non-limiting example.

As with proximity card technology, near-field communication uses magnetic induction between two loop antennas located within each other's near field, effectively forming an air-core transformer. It operates within the globally available and unlicensed radio frequency ISM band of 13.56 MHz. Most of the RF energy is concentrated in the allowed 14 kHz bandwidth range, but the full spectral envelope may be as wide as 1.8 MHz when using ASK modulation. Theoretical working distance of a near field communication system with a compact standard antennas is up to 20 cm, but with a practical working distance of about 4 centimeters.

There are two modes:
Passive communication mode: The initiator device provides a carrier fields and the target device answers by modulating the existing field. In this mode, the target device may draw its operating power from the initiator-provided electromagnetic field, thus making the target device a transponder.
Active communication mode: Both initiator and target device communicate by alternately generating their own fields. A device deactivates its RF field while it is waiting for data. In this mode, both devices typically have power supplies.

NFC employs two different codings to transfer data. If an active device transfers data at 106 kbit/s, a modified Miller coding with 100 percent modulation can be used. In all other cases Manchester coding can be used with a modulation ratio of 10 percent. NFC devices may receive and transmit data at the same time. Thus, they may check for potential collisions if the received signal frequency does not match with the transmitted signal's frequency.

In the example shown in FIG. 3-5, the NFC antenna 38 may be provided proximate the rear side of the housing 12 at the top of the apparatus 10. The NFC antenna may be located in the rear side of a top part of the phone to allow easy touching of an NFC tag on another device 40 (see FIG. 5) when the phone is in hand in normal usage position (rear of phone in the user's palm, and the display 14 facing towards the user). The earpiece loudspeaker 32 may be located in a top part of the phone to maximize distance between the earpiece 32 and microphone 30 (to minimize acoustic echo).

As can be seen in FIG. 3, the NFC antenna 38 may be a relatively large loop or coil antenna. In this example the NFC antenna is flat, with an area of about 20 mm×30 mm. However, any suitable size could be provided. The antenna 38 could be provided on a flex circuit or printed wiring board for example. In another example, the antenna 38 could be formed on the housing piece of the housing 12.

A Hearing Aid Compatibility (HAC) system is a system to interconnect a phone magnetically into a hearing aid device. In the past, a telecoil or T-coil of the HAC system was mounted inside both the hearing aid and the audio device such as the telephone handset. It allowed the signals to be coupled from the phone to the hearing aid without a wired electrical connection and it avoids the problems that microphones would have with the amplification of background noise.

A telecoil may be an induction coil. An induction coil may be a metal rod that is encircled by many turns of a copper wire. Placed in an alternating magnetic field, an alternating electrical current is "induced" in the copper wire. (Reciprocally, an electrical current in a wire creates a tiny magnetic field around it.) What happens is that the coil converts (changes) magnetic energy to electrical energy, in much the same way that a microphone converts sounds waves to electrical energy. Generally, the strength of the inductive pick-up may be determined by the number of turns of the copper wire around the metal axis rod. Larger rods permit more turns and more powerful telephone coils. "T" coils may include an integrated amplifier, which makes it feasible to reduce the physical size of the "T" coil.

When a hearing aid is switched to the "T" position, the telecoil may be set to detect only an electromagnetic field. The strength of the electrical current "induced" in the telecoil by the electromagnetic field is directly proportional to both the energy in the magnetic field and to the relative positions of the induction coil in the hearing aid to the magnetic field (in a telephone or wire loop). In some positions, little or no electrical current may be created in the induction coil. The magnetic field may simply "pass through" the coil without producing much, if any, electrical current. This is the reason why experienced hearing aid users may experiment with the positioning with unfamiliar telephones: to find the "hot spot" where the strongest signal is heard.

Figure 6:
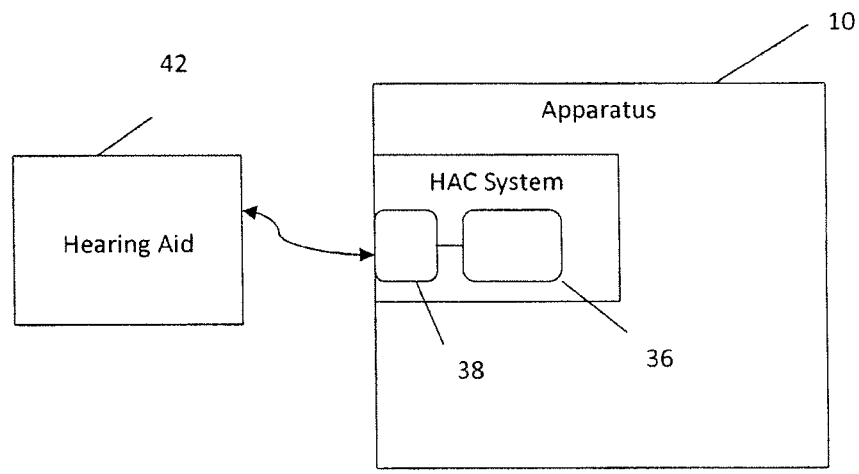
FIG. 6 is a diagram illustrating connection between the apparatus and a hearing aid with use of hearing aid compatibility.

In the apparatus 10, according to one example embodiment, the HAC system may be formed by components of the NFC system 34. In particular, the HAC system may use the NFC antenna 38 as the coil for the HAC system, and also may use the NFC circuitry 36 as circuitry for the HAC system. Thus, the NFC antenna 38 is used for two purposes or functions: 1. as the NFC coil for the NFC system 34 and 2. as the HAC coil for the HAC system. In addition, the NFC circuitry 36 may be used for two purposes or functions: 1. as the NFC circuitry for the NFC system 34 and 2. as HAC circuitry for the HAC system. As seen in FIG. 6, the user can hold the phone 10 us to his/her ear at the hearing aid 42 to allow magnetic signals from the NFC coil 38 to be received by the telecoil in the hearing aid 42.

An example embodiment comprising features described herein may utilize NFC circuitry and a NFC antenna (wherein the NFC antenna is already used for NFC) for the purpose of speech call suitable for hearing aid users. Advantages of such an example embodiment may include reduced cost of manufacture and a product design suitable for HAC requirement without adding further component and complexity.

An example embodiment relates to utilization of an "NFC" system which gives a specification for coil size and placement in a product; RF frequencies, amplitudes etc. Such coil 38 in the example embodiment may be a large (but thin); open air-filled coil printed on a flex or PWB, and optimized for NFC usage. This kind of coil may have compromised efficiency in HAC usage, but may provide a larger usage area which is easier to place against the ear for HAC use. The coil may not have a magnetic core, so it may be a smaller size (such as a discrete component soldered into a PWB). In other words, even though the coil is used for HAC, it does not need to be a telecoil. A telecoil may have a better efficiency in HAC, but may not meet NFC specifications. A telecoil also may have a very small "hot-spot" in HAC usage; meaning that the user has to move phone to find feasible audio signal. Use of the NFC coil as the coil for the HAC system may provide a much larger hot-spot because of the much larger size of the NFC coil versus a conventional telecoil.

Figure 7:
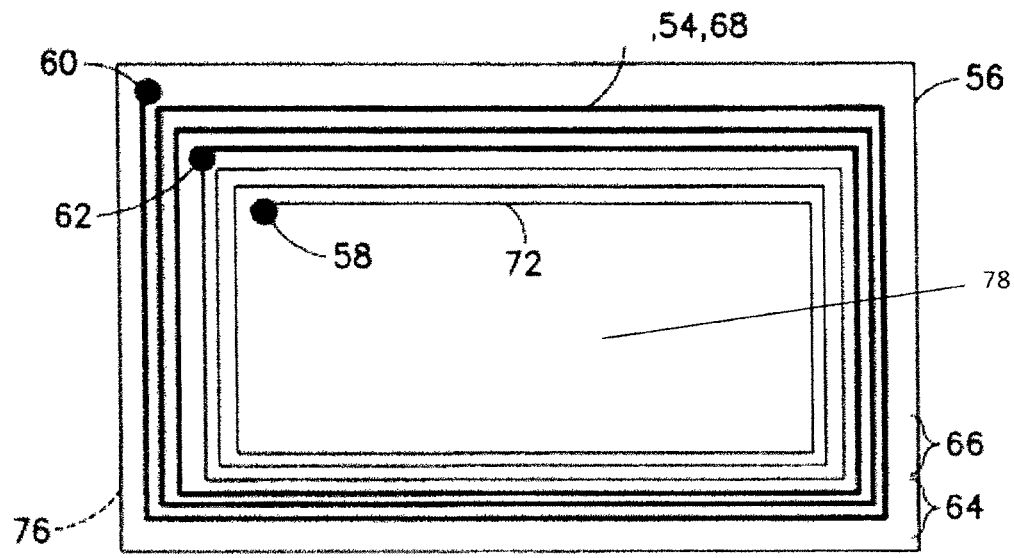
FIG. 7 is a rear side view of the coil.
Figure 8:
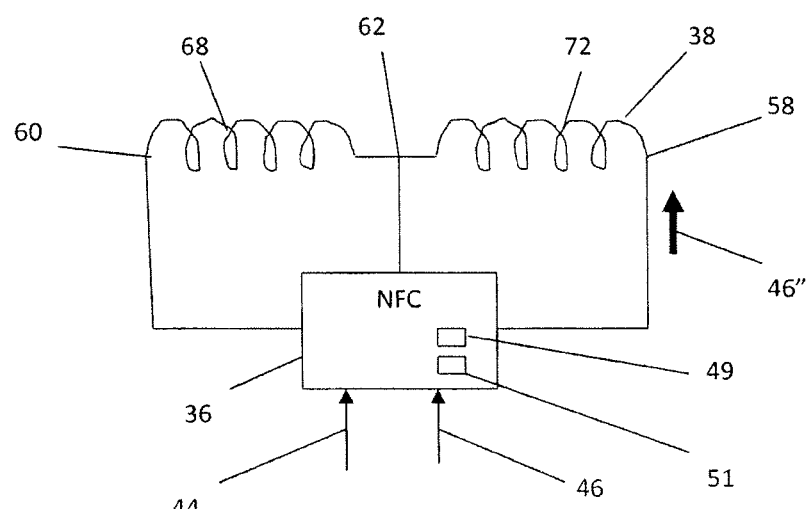
FIG. 8 is a circuit diagram illustrating connection to the coil shown in FIG. 7.

In the example shown in FIGS. 7-8, the coil 38 may have inner rounds 66 and outer rounds 64. The outer rounds 64 may form an outer coil part 68. The outer coil part 68 may be located between the middle point (third connection point) 62 and the outer end (second connection point) 60. These two points 62, 60 may be connected to the NFC circuitry 36 of the NFC system. Based upon an input 44 from the controller 20, the NFC circuitry 36 sends a non-modulated signal to the outer coil part 68. The coil part 68 uses this signal to generate a NFC initiator radio frequency field from the coil. Thus, the NFC circuitry, such as a NFC chipset for example, and the coil 38 may be used to communicate with the device 40 (see FIG. 5).

The inner rounds 66 may form an inner coil part 72. The inner coil part 72 may be located between the middle point (third connection point) 62 and the inner end (first connection point) 58. The HAC system may use the entire length of the coil 38, but the NFC system may only use a portion of the length of the coil. In this example the width of the trace 54 at the inner coil part (the inner rounds 66) is smaller than the width of the trace 54 at the outer coil part 68 (the outer rounds 64); transitioning at the middle point 62.

Figure 8A:
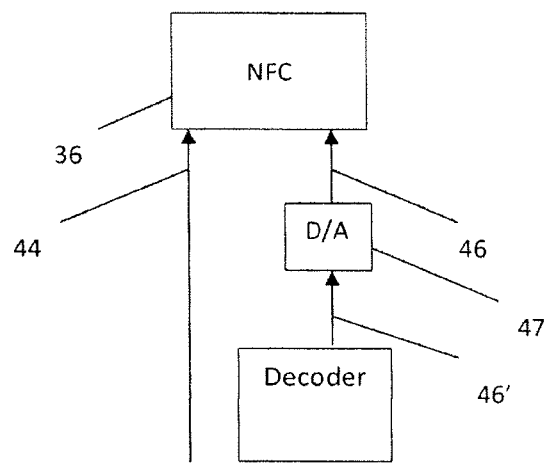
FIG. 8A is a circuit diagram illustrating another example of part of the circuit shown in FIG. 8.

For use of the HAC system, the audio circuitry (see FIG. 2 and FIG. 8) may send an audio signal 46, from an audio decoder for example, to a second input of the NFC circuitry 36. The audio signal 46 from the audio decoder to the NFC circuitry may be analog or digital. There can be different decoders in the mobile phone 10, such as one for speech and others for music applications for example. For HAC usage, only a speech audio decoder might be used for example. In the case of an analog audio signal, the PWM audio input connection may be provided in the NFC circuitry. In the case of a digital audio signal, a Digital/Analog converter may be provided by the NFC circuitry Referring also to FIG. 8A, if the audio signal 46' is digital, a Digital/Analog converter 47 may be provided to convert the digital audio signal 46' to an analog audio signal 46. The Digital/Analog converter 47 may be provided, but this function may alternatively be located in the speech decoder circuitry or in the NFC circuitry for example.

The NFC circuitry 36 may be configured to modulate the input audio signal 46, such as using pulse-width modulation (PWM) for example, amplify the signal, and output the signal to the inner end 58 of the coil 38. The NFC circuitry generates the needed carrier-signal (=amplification) even without HAC modification. Features as described herein may modulate this carrier with an audio signal. The NFC circuitry 36 may effectively form a pulse width modulator and an amplifier; functionally illustrated by 49 and 51, respectively, in FIG. 8. The modulated, amplified audio signal may be inductively coupled with a hearing aid 42 (see FIG. 6) to function as a HAC system.

This example illustrates that in an NFC mode of using the coil 38 a lesser number of rounds of the coil might be used (such as 3-4 rounds for example), and in a HAC mode of using the coil 38 more than the 3-4 rounds of the coil might be used to have a higher impedance for audio amp (such as a target 8 ohm for example). These additional rounds may be made thinner (such as a narrower line in a PWB for example) to save space and have a higher resistance. This example illustrates that the coil structure may comprise a tapped combined NFC and HAC coil with an intermediate connection point for the NFC connection, two different PWB line coil widths with a big width outer part (low resistance) for the NFC and a narrow width inner part for the HAC to get a higher impedance in an audio frequency area.

U.S. patent application Ser. No. 13/276,538 filed Oct. 19, 2011, and U.S. patent application Ser. No. 13/298,709 filed Nov. 17, 2011, which are hereby incorporated by reference in their entireties, disclose using a NFC antenna coil as a transducer for phone Hearing Aid Compatibility (HAC). HAC compliancy was made by driving the NFC antenna coil with an additional discrete audio amplifier when the NFC chipset is connected in parallel (through some filtering components). However, it may also be possible to create a HAC audio signal by modulating a NFC carrier signal. So an idea as described herein is to use a NFC chipset as kind of D-class switching audio amplifier instead of providing a separate dedicated audio amplifier for HAC.

When a separate audio amplifier is connected to a NFC coil, the antenna tuning may become very complicated. Audio lines in the printed wiring board (PWB) may affect antenna performance, and it may be difficult to isolate them as low-pass filtering components for audio frequencies are too big for mobile product implementation. If an audio signal is generated with a NFC chipset, less number of connection lines may be needed in the PWB or filtering components for audio amplification. The design may become more simple, savings in size and component cost.

By adjusting a NFC carrier signal pulse-width by an audio signal, a NFC chipset may be used similar to a D-class audio amplifier. The created audio signal may be driven to the NFC antenna coil to create the magnetic field needed for HAC. This way a phone may have HAC compliancy without any additional HAC-specific components (component cost savings, size savings).

When NFC components are used for just NFC, a dedicated chipset (such as a N×P PN544 chipset for example) may create a 13.56 MHz carrier signal. This signal is driven to the antenna coil, and inductive coupling is used for data communication. It may be possible to use the NFC chipset as a kind of D-class audio amplifier if the 13.56 MHz carrier signal PWM (pulse-width modulation) is modulated according to the audio signal. The modulated signal 46" may be sent to the inner end 58 of the coil 38 as shown in FIG. 8. The HAC signal may be created by using a NFC coil as the HAC transducer. A feature is to save component cost and reduce product size, and simplify NFC antenna tuning while no additional audio PWB lines or filtering components may not be needed in parallel with the NFC.

The components may be build to adjust NFC carrier frequency pulse-width by audio, and use this chipset as kind of D-class switching audio amplifier. Versus a conventional NFC chipset, an additional PWM input or D/A converter may be provided to the NFC chip/chipset to allow this functionality.

HAC compliancy may be provided without any additional components. When the NFC antenna coil with an additional audio amplifier (like stereo-IHF-amplifier "extra" channel), some additional serial resistor (or additional antenna coil rounds) may be provided to get load impedance of the antenna high enough. If the NFC chipset is used as an amplifier, output impedance is already optimized for the existing coil.

The principle of using the same hardware for both NFC and HAC is a novel concept. Using the same amplifier (the NFC circuitry 36) in addition to the same coil (NEC antenna 38) is a good extension of multi-use of components for different functions. The audio information in the modulated signal and generated magnetic field may be still in the audio band, not around the carrier. So, both the amplifier (NFC circuitry 36), and the HAC/NFC coil may be configured to pass audio band signals. After the amplifier and coil have been improved to handle also audio band signals, the benefit of one amplifier instead of two may be achieved. Possibly, a solution capable of simultaneous HAC audio and NFC signal could be implemented as well.

In another alternate example, the NFC circuitry 36 may be used with two different coils; one for the NFC system and a different one for the HAC system. FIG. 8 shows the parts 68, 72 as two coils, but this is merely for the sake of understanding. An example could have more than one coil, but the example shown in FIG. 7 is one coil with multiple loops or rounds and an intermediate feeding point. Schematic FIG. 8 also merely helps to understand that the thinner and thicker parts of the single line/trace which can be used in the different parts 68, 72.

Figure 9:
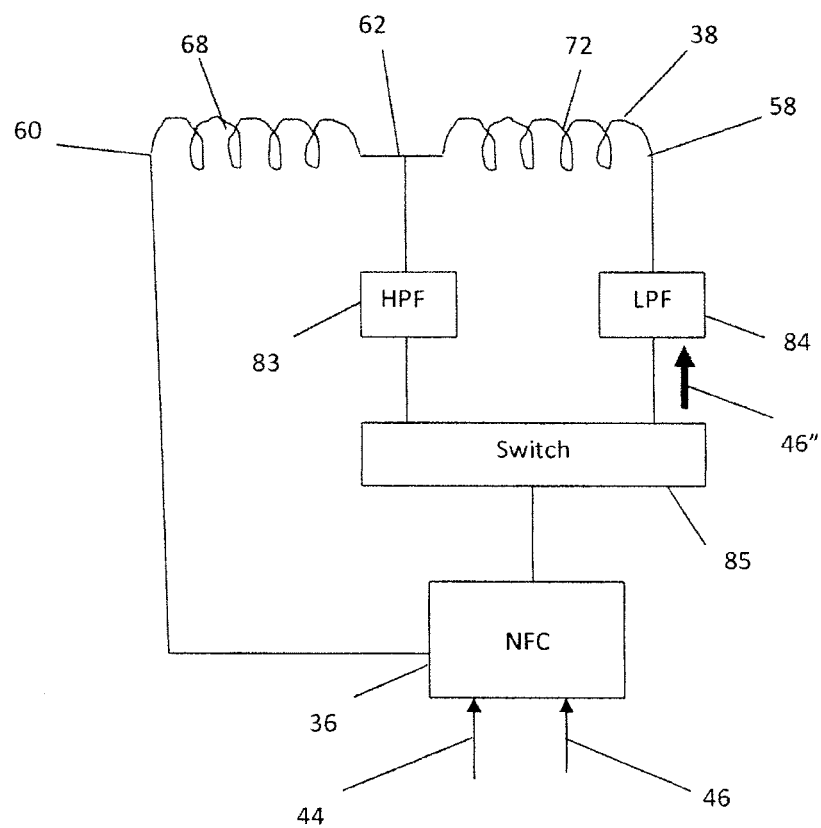
FIG. 9 is a circuit diagram of an alternative example embodiment.

Referring also to FIG. 9, in one type of example the circuitry may include filters 83 and 84. Filter 83 may be a high-pass filter such as less than 13.56 MHz for example. The filter 84 may be a low-pass filter such as greater than 20 kHz for example. In real application there might also be some additional EMC and tuning filtering components, but the two filters 83, 84 help to illustrate how separation may be accomplished between different usage modes. A switch 85 may be used to direct the output from the NFC circuitry 36 to feed point 58 for HAC operation or feed point 62 for NFC operation.

This example helps to illustrate, because of the filters 83, 84, how in a NFC mode the coil part 68 may be used and in a HAC mode both coil parts 68, 72 may be used. The figure clarifies the situation how these loops/rounds are configured can depend on the usage modes. For example, as noted above the HAC mode may use additional rounds/loops to have higher impedance for targeting the audio amplifier (such as a target 8 Ohm for example) where the additional (i.e. inner) rounds/loops may use thinner/narrower wire/line to save space and have a higher impedance. The filters 83, 84 may be used to distinguish between modes of use of the coil(s) and/or the controller may be used to distinguish between modes of use of the coil(s). Different parts of a single coil may be used with the different systems (NFC/HAC). Perhaps more than one coil may be used (not necessarily a single coil as shown in FIG. 7). If the HAC system uses the NFC coil part 64/68, the additional coil part of the HAC coil could be anything (any suitable size or shape).

The example embodiments shown in the drawings are not the only possibility of the shape of the coil(s). The inner coil part can have a different size and shape than the outer coil part, or the coils or coil parts could be at least partially stacked top of each other in other types of example embodiment. However, the coils/coil parts may be located somehow symmetrically to get out good magnetic flux for the HAC operation when the coils/coil parts are connected in series. Thus, the NFC coil part 64/68 may be used as both the coil of the NFC and at least part of the coil for the HAC; regardless of what additional coil part the HAC might use. Example embodiments might have only one coil or might have more than one coil.

As illustrated in FIG. 7, ferrite plating 76 may be placed at the backside of the flex 56 of the NFC coil part 68. The inner coil part 72 and the central part 78 of the flex 56 may be provided without the ferrite. The NFC performance may be compromised a little bit, but there may be much better HAC performance. The open central area in the coil 38 allows location of a component in an open central area of the flex 56, such as a camera, to extend through the area in the middle of the coil 38. In one type of alternate embodiment, the ferrite may be provided without the camera. In another type of alternate embodiment a hole through the flex for the camera may be provided without providing ferrite on the flex.

In one example, an apparatus 10 is provided comprising an antenna 38; and near field communication (NFC) circuitry 36 connected to the antenna. The NFC circuitry may be configured to create a modulated signal from an input audio signal, and output the modulated signal to the antenna.

The NFC circuitry may be a near field communication (NFC) chipset. The NFC circuitry may be configured to amplify the input audio signal as the modulated signal. The antenna may be a part of a hearing aid compatibility (HAC) antenna. The apparatus may further comprise a connection of the NFC circuitry to a first location 62 of the antenna and to another location 58 of the HAC antenna. The NFC circuitry and the hearing aid compatibility (HAC) antenna may form a hearing aid compatibility (HAC) system of the apparatus. The apparatus may comprise a near field communication (NFC) system comprising the NFC circuitry and the antenna, where the NFC circuitry forms a single amplifier of both the NFC system and the HAC system. The apparatus may comprise audio signal circuitry 31 connected to an input of the NFC circuitry to send the input audio signal 46 from the audio signal circuitry to the NFC circuitry. The NFC circuitry 36 may form an audio signal amplifier using pulse-width modulation (PWM) on the input audio signal to produce the modulated signal. The apparatus may comprise means for using the NFC circuitry for a hearing aid compatibility (HAC) system.

Figure 10:
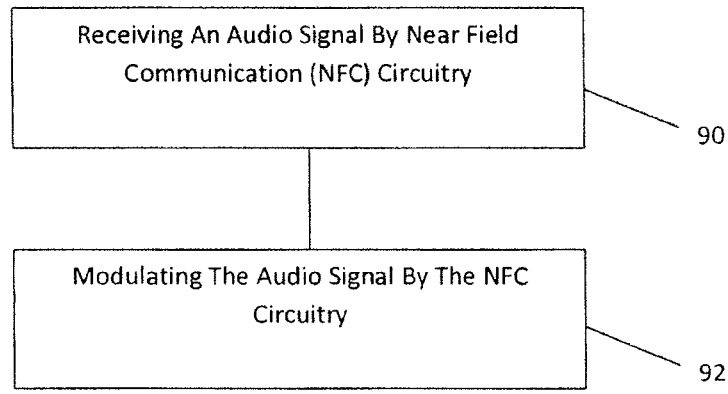
FIG. 10 is a diagram illustrating steps of an example method.

Referring also to FIG. 10, an example method may comprise receiving an audio signal by near field communication (NFC) circuitry as indicated by block 90; and modulating the audio signal by the NFC circuitry as indicated by block 92. The NFC circuitry may provide a pulse-width modulation (PWM) of the audio signal to produce a resultant modulated signal, amplifies the resultant modulated signal, and outputs the amplified modulated signal to an antenna. The method may further comprise outputting a non-modulated signal from the NFC circuitry to the antenna, where the antenna generates a NFC initiator radio frequency field from the antenna based upon the non-modulated signal. The method may further comprise outputting a non-modulated signal from the NFC circuitry to an antenna which is connected to the NFC circuitry, where the antenna generates a NFC initiator radio frequency field from the antenna based upon the non-modulated signal. The method may further comprise audio circuitry sending the audio signal to an input of the NFC circuitry, where the input is an input of a NFC chipset.

Figure 11:
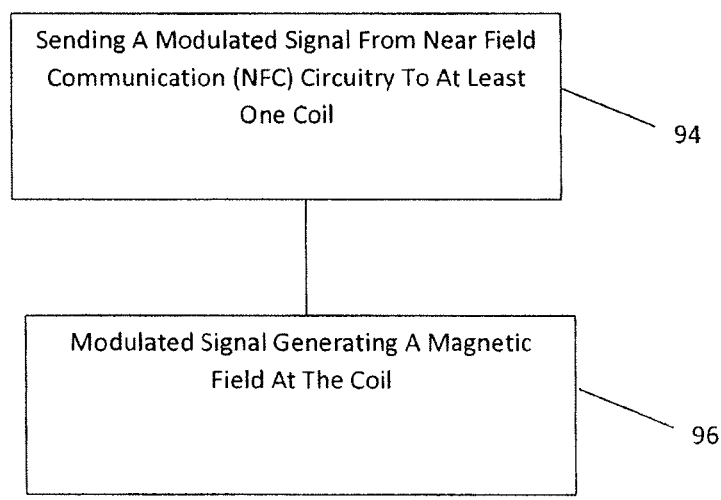
FIG. 11 is a diagram illustrating steps of another example method.

Referring also to FIG. 11, a method may comprise sending a modulated signal from near field communication (NFC) circuitry to at least one antenna as indicated by block 94, where the modulated signal is formed from an audio signal received by the NFC circuitry; and the modulated signal generating a magnetic field at the antenna as indicated by block 96, where the NFC circuitry and the antenna form part of a hearing aid compatibility (HAC) system. The method may further comprise sending a non-modulated signal from the NFC the at least one antenna to generate a NFC initiator radio frequency field from the antenna based upon the non-modulated signal. The method may further comprise sending the modulated signal to a first location of the at least one antenna, and sending the non-modulated signal to a second different location of the at least one antenna.

In another example, a non-transitory program storage device readable by a machine such as memory 24 or on a computer server for example, tangibly embodying a program of instructions executable by the machine for performing operations, may be provided where the operations comprise sending an audio signal to near field communication (NFC) circuitry, where the NFC circuitry is configured to form a modulated signal based upon the audio signal; and sending the modulated signal to an antenna to generate a magnetic field at the antenna as part of a hearing aid compatibility (HAC) system.

According to one example embodiment, an apparatus may comprise means for sending an audio signal to near field communication (NFC) circuitry, where the NFC circuitry is configured to form a modulated signal based upon the audio signal, and means for sending the modulated signal to a coil antenna to generate a magnetic field at the coil antenna as part of a hearing aid compatibility (HAC) system.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
a coil, where the coil is at least a part of a near field communication antenna; and
near field communication (NFC) circuitry connected to the coil, where the NFC circuitry and the coil form at least part of a hearing aid compatibility (HAC) system of the apparatus,
where the apparatus comprises a near field communication (NFC) system comprising the NFC circuitry and the coil, and where the NFC circuitry forms an amplifier of both the NFC system and the HAC system,
where the NFC circuitry is configured to create a modulated signal from an input analog audio signal, and output the modulated signal to the coil to generate a magnetic field induction signal from the coil, where the magnetic field induction signal comprises data of the input analog audio signal, where the NFC circuitry forms the amplifier as an audio signal amplifier which is configured to use pulse-width modulation (PWM) on the input analog audio signal to produce the modulated signal,
where the HAC system is configured such that in a HAC mode additional rounds/loops of the coil are used than when in a NFC mode to have an impedance for targeting the audio signal amplifier.

2. An apparatus as in claim 1 where the NFC circuitry is a near field communication (NFC) chipset.

3. An apparatus as in claim 1 where the NFC circuitry is configured to amplify the input analog audio signal as the modulated signal.

4. An apparatus as in claim 1 further comprising a first connection of the NFC circuitry to a first feed location of the coil and a second connection of the NFC circuitry to a second feed location of the coil.

5. An apparatus as in claim 1 where the apparatus comprises audio signal circuitry connected to an input of the NFC circuitry to send the input analog audio signal from the audio signal circuitry to the NFC circuitry.

6. An apparatus as in claim 1 comprising means for using the NFC circuitry for a hearing aid compatibility (HAC) system.

7. An apparatus as in claim 1 where the apparatus is at least part of a hand-held communications device.

8. An apparatus as in claim 1 further comprising audio circuitry configured to output the analog audio signal to the near field communication (NFC) circuitry.

9. An apparatus as in claim 8 where the audio circuitry comprises a speech decoder configured to form the analog audio signal from a voice signal, and transmit the analog audio signal directly to the near field communication (NFC) circuitry.

10. An apparatus as in claim 1 where the HAC system is configured such that the impedance for targeting the audio signal amplifier comprises the apparatus being configured to drive the HAC system by the audio signal amplifier.

11. A method comprising:
receiving an analog audio signal by near field communication (NFC) circuitry;
modulating the audio signal by the NFC circuitry; and
outputting the modulated audio signal to a coil to generate a magnetic field induction signal from the coil, where the magnetic field induction signal comprises data of the analog audio signal, where the coil is at least a part of a near field communication antenna, where the NFC circuitry and the coil form at least part of a hearing aid compatibility (HAC) system, where a near field communication (NFC) system is provided comprising the NFC circuitry and the coil, and where the NFC circuitry forms an amplifier of both the NFC system and the HAC system,
where the NFC circuitry provides a pulse-width modulation (PWM) of the analog audio signal to produce a resultant modulated signal, amplifies the resultant modulated signal, and outputs the amplified modulated signal to at least a portion of the coil,
where the HAC system is configured such that in a HAC mode additional rounds/loops of the coil are used than when in a NFC mode to have an impedance for targeting the amplifier.

12. A method as in claim 11 further comprising outputting a non-modulated signal from the NFC circuitry to the coil, where the coil generates a NFC initiator radio frequency field from the coil based upon the non-modulated signal.

13. A method as in claim 11 further comprising outputting a non-modulated signal from the NFC circuitry to an antenna which is connected to the NFC circuitry, where the antenna generates a NFC initiator radio frequency field from the antenna based upon the non-modulated signal.

14. A method as in claim 11 where targeting the amplifier comprises driving the HAC system by the amplifier.

15. A method comprising:
providing pulse-width modulation (PWM) of an analog audio signal by near field communication (NFC) circuitry to produce a resultant modulated signal, where the resultant modulated signal is formed from the analog audio signal received by the NFC circuitry;

sending the resultant modulated signal with amplification by the near field communication (NFC) circuitry from the near field communication (NFC) circuitry to at least one coil, where the coil is at least a part of a near field communication antenna, where the NFC circuitry and the coil form at least part of a hearing aid compatibility (HAC) system, where a near field communication (NFC) system is provided comprising the NFC circuitry and the coil, and where the NFC circuitry forms an amplifier of both the NFC system and the HAC system; and the amplified resultant modulated signal generating a magnetic field induction signal at the coil, where the NFC circuitry and the coil form part of the HAC system, and where the magnetic field induction signal is a HAC signal comprising data of the analog audio signal, where the HAC system is configured such that in a HAC mode additional rounds/loops of the coil are used than when in a NFC mode to have an impedance for targeting the amplifier.

16. A method as in claim 15 further comprising sending a non-modulated signal from the NFC circuitry to the at least one coil to generate a NFC initiator radio frequency field from the coil based upon the non-modulated signal.

17. A non-transitory program storage device readable by a machine, tangibly embodying a program of instructions executable by the machine for performing operations, the operations comprising:

sending an analog audio signal to near field communication (NFC) circuitry;

providing pulse-width modulation (PWM) of the analog audio signal by the near field communication (NFC) circuitry to produce a resultant modulated signal;, where the NFC circuitry is configured to form the resultant modulated signal based upon the analog audio signal; and sending the resultant modulated signal with amplification by the near field communication (NFC) circuitry to a coil to generate a magnetic field induction signal at the coil as part of a hearing aid compatibility (HAC) system, where the magnetic field induction signal comprises data of the analog audio signal, where the coil is at least a part of a near field communication antenna, where the NFC circuitry and the coil form at least part of the HAC system, where a near field communication (NFC) system is provided comprising the NFC circuitry and the coil, and where the NFC circuitry forms an amplifier of both the NFC system and the HAC system, where the HAC system is configured such that in a HAC mode additional rounds/loops of the coil are used than when in a NFC mode to have an impedance for targeting the amplifier.

* * * * *